United States Patent
Toyota et al.

(10) Patent No.: US 8,483,274 B2
(45) Date of Patent: Jul. 9, 2013

(54) AUTOMATIC SELECTION OF ENCODING PARAMETERS TO CONTROL LENGTH OF TIME TO ENCODE AND SEND DATA OVER NETWORK

(75) Inventors: Yosuke Toyota, Saitama (JP); Akio Yoneyama, Saitama (JP)

(73) Assignee: KDDI Corporation, Tokyo (JP)

( * ) Notice: Subject to any disclaimer, the term of this patent is extended or adjusted under 35 U.S.C. 154(b) by 373 days.

(21) Appl. No.: 12/892,051

(22) Filed: Sep. 28, 2010

(65) Prior Publication Data

US 2011/0080950 A1 Apr. 7, 2011

(30) Foreign Application Priority Data

Oct. 3, 2009 (JP) ................................. 2009-231047

(51) Int. Cl.
*H04N 11/02* (2006.01)
(52) U.S. Cl.
USPC ................................ 375/240.12; 375/240.28
(58) Field of Classification Search
USPC ... 725/37; 709/219, 247; 708/208; 375/240.12, 375/240.28
See application file for complete search history.

(56) References Cited

U.S. PATENT DOCUMENTS 7,533,398 B2 * 5/2009 Cullinan et al. ................ 725/37
2002/0194361 A1 * 12/2002 Itoh et al. ...................... 709/233

FOREIGN PATENT DOCUMENTS

JP A-7-175707 7/1995

OTHER PUBLICATIONS

Yosuke Toyota et al., "A Video Transmission System Adapted for Workflow of News Gathering," 2009 Annual Convention by the Institute of Image Information and Television Engineers, CD-ROM 10-2, Aug. 27, 2009 (with Abstract).

* cited by examiner

*Primary Examiner* — Christopher S Kelley
*Assistant Examiner* — Deirdre Beasley
(74) *Attorney, Agent, or Firm* — Oliff & Berridge, PLC (57) ABSTRACT

Data processing including encoding and sending is disclosed, which includes: encoding data using a selected one of a plurality of parameter sets each of which has at least one encoding parameter; calculating a length of an assigned time not exceeding a time limit for an original data set to be sent, per each data sub-set; calculating an estimate of an individual processing time $T_P$ to encode and send each data sub-set using a successively-selected one of the plurality of encoding parameter sets, based on the assigned time, an estimate of an encoding time $T_E$ to encode each data sub-set using the successively-selected one encoding parameter set, and an estimate of a sending time $T_T$ to send the encoded data sub-set; and selecting one of the plurality of encoding parameter sets to allow a total processing time not to exceed the time limit.

12 Claims, 8 Drawing Sheets

| PARAMETER SET | | | ENCODING TIME TO ENCODE DATA OF UNIT SIZE |
|---|---|---|---|
| VIDEO FORMAT | QUALITY | BIT RATE | |
| HDV(1440 × 1080) | HIGH QUALITY | 8 Mbps | 30 SECONDS |
| HDV(1440 × 1080) | STANDARD | 8 Mbps | 27 SECONDS |
| HDV(1440 × 1080) | HIGH SPEED | 8 Mbps | 24 SECONDS |
| HDV(1440 × 1080) | HIGH QUALITY | 4 Mbps | 26 SECONDS |
| HDV(1440 × 1080) | STANDARD | 4 Mbps | 24 SECONDS |
| HDV(1440 × 1080) | HIGH SPEED | 4 Mbps | 22 SECONDS |
| HDV(1280 × 720) | HIGH QUALITY | 4 Mbps | 18 SECONDS |
| HDV(1280 × 720) | STANDARD | 4 Mbps | 16 SECONDS |
| HDV(1280 × 720) | HIGH SPEED | 4 Mbps | 14 SECONDS |
| DV(720 × 480) | HIGH QUALITY | 2 Mbps | 10 SECONDS |
| DV(720 × 480) | STANDARD | 2 Mbps | 7 SECONDS |
| DV(720 × 480) | HIGH SPEED | 2 Mbps | 4 SECONDS |

FIG.7

| VIDEO DATA | IMAGE SIZE | PLAY-BACK TIME | ASSIGNED-TIME RATIO (TIME LIMIT OF 90 SECONDS) |
|---|---|---|---|
| FIRST VIDEO DATA SUB-SET | — | 10 SECONDS | 1 (15 SECONDS) |
| SECOND VIDEO DATA SUB-SET | — | 20 SECONDS | 2 (30 SECONDS) |
| THIRD VIDEO DATA SUB-SET | — | 30 SECONDS | 3 (45 SECONDS) |

FIG.8A

| VIDEO DATA | VIDEO FORMAT IMAGE SIZE | IMAGE-RESOLUTION RATIO | PLAY-BACK TIME | ASSIGNED-TIME RATIO (TIME LIMIT OF 90 SECONDS) |
|---|---|---|---|---|
| FIRST VIDEO DATA SUB-SET | DV(720×480) | 1 | — | 1 (12 SECONDS) |
| SECOND VIDEO DATA SUB-SET | HDV(720p)(1280×720) | 2.5 | — | 2.5 (30 SECONDS) |
| THIRD VIDEO DATA SUB-SET | HDV(1080i)(1440×1080) | 4 | — | 4 (48 SECONDS) |

FIG.8B

| VIDEO DATA | VIDEO FORMAT IMAGE SIZE | IMAGE-RESOLUTION RATIO | PLAY-BACK TIME | ASSIGNED-TIME RATIO (TIME LIMIT OF 90 SECONDS) |
|---|---|---|---|---|
| FIRST VIDEO DATA SUB-SET | SD(720×480) | 1 | — | 1 |
| SECOND VIDEO DATA SUB-SET | HD(1440×1080) | 4 | — | 4 |

FIG.8C

| VIDEO DATA | IMAGE SIZE | IMAGE-RESOLUTION RATIO | PLAY-BACK TIME | ASSIGNED-TIME RATIO (TIME LIMIT OF 90 SECONDS) |
|---|---|---|---|---|
| FIRST VIDEO DATA SUB-SET | DV(720×480) | 1 | 10 SECONDS | 1 (7 SECONDS) |
| SECOND VIDEO DATA SUB-SET | HDV(1080i)(1440×1080) | 4 | 30 SECONDS | 12 (83 SECONDS) |

FIG.8D

AUTOMATIC SELECTION OF ENCODING PARAMETERS TO CONTROL LENGTH OF TIME TO ENCODE AND SEND DATA OVER NETWORK

CROSS-REFERENCE TO RELATED APPLICATIONS

The present application is based on and claims the benefit of priority from Japanese Patent Application No. 2009-231047 filed Oct. 3, 2009, the content of which is incorporated herein by reference in its entirety.

BACKGROUND OF THE INVENTION

1. Field of the Invention

The invention relates generally to techniques of encoding data that is to be sent, using a selected one of encoding parameters, and sending the encoded data to a destination over a network.

2. Description of the Related Art

One of traditional techniques, which are directed to transmission of compressible data, is to shorten a time to send the data (e.g., see Japanese Patent Application Publication No. HEI 07-175707, for example). According to this technique, a data transmission device is configured to calculate a sum of an estimated time to compress data that is to be sent, and an estimated time to send or transfer the compressed data to a destination. If the sum is smaller than an estimated time to send the data that remains uncompressed, then the data transmission device enters into a compression mode to compress the data and send the compressed data.

An alternative traditional technique is directed to a video storage transmission system that allows video data stored to be transmitted via a network (see "A Video Transmission System Adapted for Workflow of News Gathering" co-authored by Yosuke TOYOTA and Akio YONEYAMA, 2009 Annual Convention by the Institute of Image Information and Television Engineers, CD-ROM 10-2, Aug. 27, 2009, and U.S. Pat. No. 7,533,398, for example). This technique allows video data which has been stored in a data transmission device, to be encoded and sent, so that the encoding and sending can be completed within a time limit (i.e., by a deadline time).

In this regard, the term "encoding" refers to operation to encode original data according to a given encoding rule, which is exemplified by data compression, data encryption, or the like. For video data, a number of encoding functions have been provided, which are distinguishable by their own different combinations of encoding parameters (e.g., a video format, image resolution, etc.).

It is added that none of these traditional techniques refers to a possible drop in network transmission quality during transmission session.

BRIEF SUMMARY OF THE INVENTION

When there is a need for sending video data for broadcasting, the video data is required to have maximized quality. Transmission quality of such video data depends on a type of an encoding parameter employed in encoding operation. Nevertheless, the higher the required quality of video data to be created, the longer a time required to encode the video data. The longer the required encoding time, the less frequently the video data can reach the destination by the deadline time.

As a result, in view of a tradeoff between quality of network transmission and the length of an encoding time, selection of encoding parameters should be made. In addition, selection of encoding parameters has an impact on a data size of encoded video-data, resultantly creating a factor to determine the length of a time to send the encoded data.

The aforementioned traditional techniques disclosed in "A Video Transmission System Adapted for Workflow of News Gathering," and U.S. Pat. No. 7,533,398, which are intended to complete transmission of video data within a time limit, fail to complete transmission of video data within the time limit, if network quality becomes poorer (i.e., the transmission rate drops) than expected during transmission.

None of the above prior-art references discloses a technique of controlling data transmission in consideration of a possible drop in the network quality, to allow the data transmission to be completed within a time limit, even in the presence of a network quality drop.

In view of the foregoing, it would be desirable to encode original data that is to be sent, using encoding parameters which can maximize the quality of resulting encoded data, while ensuing the encoded data to reach the destination by the deadline time.

According to a first aspect of the invention, an apparatus is provided for data processing including encoding and sending, comprising:

an encoder encoding data using a selected one of a plurality of parameter sets each of which has at least one encoding parameter;

a transmitter transmitting the encoded data to a receiver via a communication network;

a condition-identifying device identifying an original data set for which the data processing is to be initiated at a start time $t_0$, and identifying a deadline time $t_L$ by which the data processing is to be completed, wherein the original data set is one data sub-set or a sequence of two or more data sub-sets;

an assigned-time calculator calculating a length of an assigned time not exceeding a time limit ($=t_L-t_0$) for the original data set, per each data sub-set;

a processing-time calculator calculating an estimate of an individual processing time $T_P$ to encode and send each data sub-set using a successively-selected one of the plurality of encoding parameter sets, per each data sub-set, based on the assigned time for the each data sub-set, an estimate of an encoding time $T_E$ to encode the each data sub-set using the successively-selected one encoding parameter set, and an estimate of a sending time $T_T$ to send the encoded data sub-set at a transmission rate; and an encoding-parameter selector selecting one of the plurality of encoding parameter sets to allow a total processing time not to exceed the time limit ($=t_L-t_0$), wherein the total processing time, if the original data set is one data sub-set, is equal to the individual processing time for the one data sub-set, or if the original data set includes a sequence of two or more data sub-sets, is equal to a total of the individual processing times for the two or more data sub-sets.

According to a second aspect of the invention, a method is provided for data processing including encoding and sending, comprising:

encoding data using a selected one of a plurality of parameter sets each of which has at least one encoding parameter;

sending the encoded data to a receiver via a communication network;

identifying an original data set for which the data processing is to be initiated at a start time $t_0$, and identifying a deadline time $t_L$ by which the data processing is to be completed, wherein the original data set is one data sub-set or a sequence of two or more data sub-sets;

calculating a length of an assigned time not exceeding a time limit ($=t_L-t_0$) for the original data set, per each data sub-set;

calculating an estimate of an individual processing time $T_P$ to encode and send each data sub-set using a successively-selected one of the plurality of encoding parameter sets, per each data sub-set, based on the assigned time for the each data sub-set, an estimate of an encoding time $T_E$ to encode the each data sub-set using the successively-selected one encoding parameter set, and an estimate of a sending time $T_T$ to send the encoded data sub-set at a transmission rate; and selecting one of the plurality of encoding parameter sets to allow a total processing time not to exceed the time limit ($=t_L-t_0$), wherein the total processing time, if the original data set is one data sub-set, is equal to the individual processing time for the one data sub-set, or if the original data set includes a sequence of two or more data sub-sets, is equal to a total of the individual processing times for the two or more data sub-sets.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

According to the invention, the following modes are provided as illustrative embodiments of the invention.

According to a first mode of the invention, there is provided the apparatus according to the first aspect of the invention, wherein the original data set includes a video data set, the at least one encoding parameter includes one or more of the followings:

a ratio of frames to be encoded using intra-frame prediction in a spatial field;

a ratio of frames to be encoded using inter-frame prediction;

a size of search range for inter-frame prediction;

a type of an algorithm for inter-frame prediction;

a size of quantization parameters;

a factor for pixel subsampling;

a factor for chroma subsampling;

a number of frames per a unit time;

a type of an encoding algorithm for data compression;

a type of frequency transformation of pixels;

a video format;

an image size (image resolution);

a frame rate; and a bit rate for encoding.

According to a second mode of the invention, the apparatus according to the first mode is provided, wherein the assigned-time calculator calculates, if the original data set is a sequence of two or more data sub-sets, the length of the assigned time for each of data sub-set, based on one or more of the followings: a play-back-time ratio, an image-size ratio, a frame-rate ratio, and a bit-rate ratio, between the data sub-sets within the original data set.

According to a third mode of the invention, the apparatus according to the first aspect is provided, further comprising a transmission-rate detector measuring the transmission rate at which data flows over the network, during a process of sending the encoding data.

According to a fourth mode of the invention, the apparatus according to the third mode is provide, wherein the transmission-rate detector samples transmission rates in a plurality of different time zones within a day or a few days, and calculates a representative transmission rate based on the sampled transmission rates.

According to a fifth mode of the invention, the apparatus according to the first aspect is provided, wherein the encoding-parameter selector selects one of the plurality of parameter sets, which allows the total processing time falls within a shortened time limit ($=\alpha \cdot t_L-t_0$, $0<\alpha<1$) that is equal to the time limit ($=t_L-t_0$) minus a marginal time.

According to a sixth mode of the invention, the apparatus according to the fifth mode, wherein the encoding-parameter selector selects one of the plurality of parameter sets, which allows the total processing time to end at a time closer to an advanced deadline time ($=\alpha \cdot t_L$), than any other parameter sets.

According to a seventh mode of the invention, the apparatus according to the first aspect is provided, further comprising:

a performance detector causing the encoder to encode test data, using a successively-selected one of the plurality of parameter sets, measuring an encoding time to encode the test data, and obtaining an encoding time to encode a portion of the original data set which has a unit size; and an encoding-time storage storing encoding times obtained by the performance detector, in association with the respective parameter sets, wherein the processing-time calculator calculate the processing time by reference to the encoding times stored in the encoding-time storage.

According to an eighth mode of the invention, the apparatus according to the third mode is provided, further comprising an encoding-parameter changer activating the processing-time calculator and the encoding-parameter selector again, at a time when the transmission-rate detector measures the transmission rate lower than a predetermined threshold, during a process of sending the encoded data, and/or at a time when an integral amount of data that was sent for a given time period becomes smaller by above a predetermined value, than an initially-estimated amount of data, during a process of sending the encoded data.

According to a ninth mode of the invention, the apparatus according to the eighth mode is provided, wherein the transmission-rate detector measures the transmission rate periodically, and/or the transmission-rate detector measures the transmission rate, at one or more of the followings:

a time when encoding the original data set is completed, a time during which encoded data is being sent, a time when sending the encoded data is completed, a time when a percentage of the encoding operation that has been finished reaches a given value, at a time when a percentage of the sending operation that has been finished reaches a given value, and at a time when a percentage of the entire data processing operation that has been finished reaches a given value, and the encoding-parameter changer estimates the transmission rate at a subsequent time, based on at least one transmission rate measured at at least one previous time.

According to a tenth mode of the invention, a computer-readable non-transitory recording media is provided which has stored therein a program which, when executed by a computer, implements the method according to the second aspect.

The "computer-readable non-transitory storage medium" may be realized in any one of a variety of types, including a magnetic recording medium, such as a flexible-disc, an optical recording medium, such as a CD and a CD-ROM, an optical-magnetic recording medium, such as an MO, an un-removable storage, such as a ROM, for example.

Several presently preferred embodiments of the invention will be described in more detail by reference to the drawings in which like numerals are used to indicate like elements throughout.

By reference to the drawings, a data transmission method according to an illustrative embodiment of the present invention and a data transmission device for implementing the data transmission method will be described below in detail.

Figure 1A:
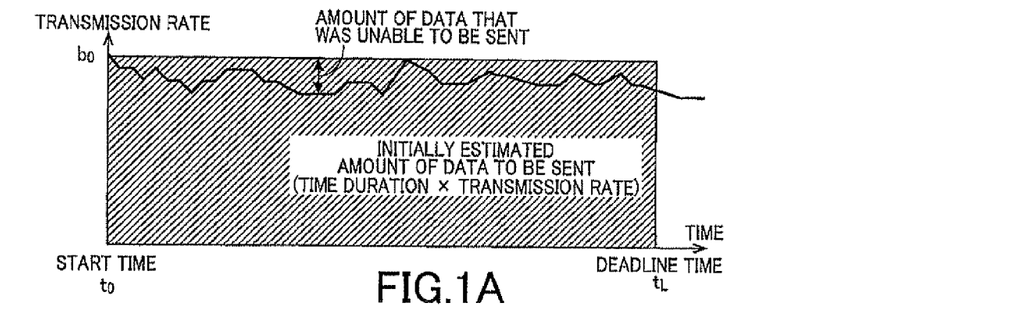
FIGS. 1A-1D are line graphs indicative of temporal changes in transmission rate in network in a comparative example relative to an illustrative embodiment of the invention.
Figure 1B:
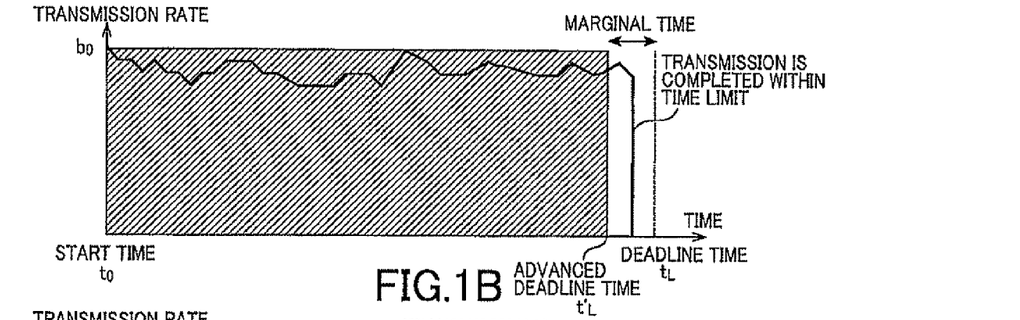
Figure 1C:
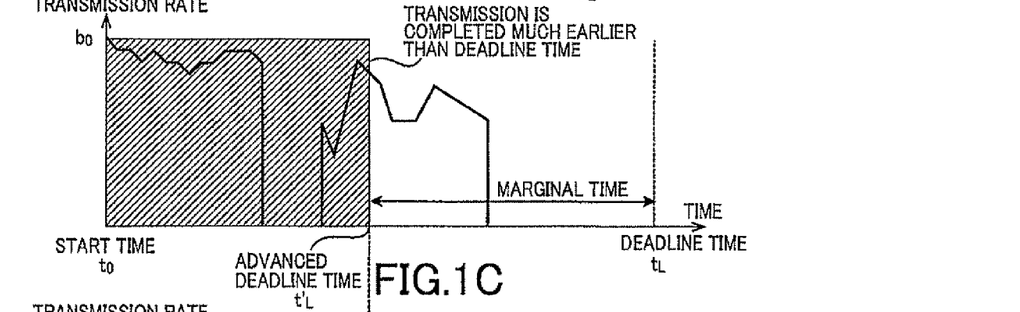
Figure 1D:
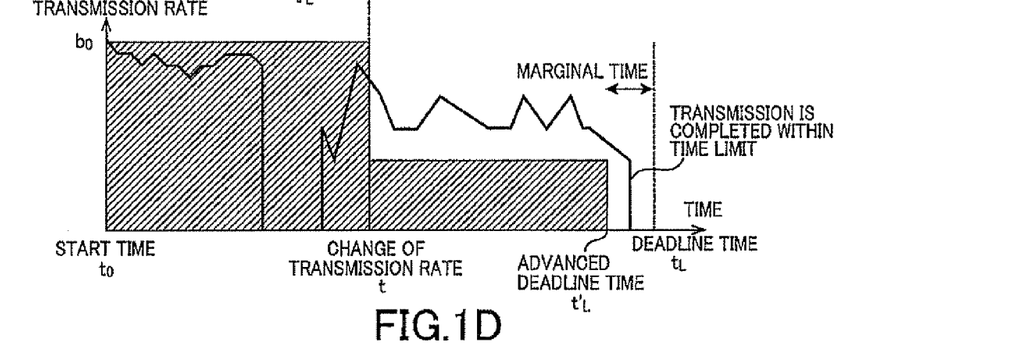

FIGS. 1A-1D illustrates line graphs with crosshatched rectangles for schematic and comparative explanation of the present embodiment. Each of the crosshatched rectangles indicates a total amount of transmittable data estimated at a time that a transmission event starts or a time that a transmission rate is changed. Each of the line graphs indicates a temporal change in bit rate in an actual communication network, and an area defined by each line graph indicates an total amount of data which was actually transmitted. FIG. 1A illustrates an example of a conventional technique, while FIGS. 1B-1D illustrates various exemplified implementations of the present invention. Notably, in the implementation illustrated in FIG. 1D, the transmission rate is controlled to be dynamically changed according to an exemplary scheme according to the present invention.

In each of the line graphs of FIGS. 1A-1D, a horizontal axis indicates lapse of time, on which there are taken a start time $t_0$ at which transmission of the original data starts, and a deadline time $t_L$ by which the transmission of the original data has to be completed, while a vertical axis indicates the transmission rate in network, with each line graph indicating temporal changes in the transmission rate.

FIGS. 1A and 1B illustrate two scenarios where the transmission rate tends to show a relatively small drop during transmission. In general, the transmission rate in network does not remain unchanged but changes over time, and the drop in the transmission rate is identified by an integrated amount of data that was sent for a given time, the average of a plurality of instantaneous values of an amount of data that was sent, or the like. The transmission rate varies within a relatively small range.

In the scenario illustrated in FIG. 1A, the transmission rate (bps) is measured as "$b_0$" at the start time $t_0$, and, at an initial stage, it is estimated that data having a size of $((t_L-t_0) \cdot b_0)$ (i.e., the area hatched in FIG. 1A) will be sent to a destination within a time limit $(=t_L-t_0)$, under the premise that the transmission rate remains unchanged after the start time $t_0$.

If, however, an actual drop of the network transmission quality lowers the actual transmission rate, then the total amount of data that can be sent within the time limit $(=t_L-t_0)$ will be smaller than the initially estimated amount of data that can be sent. In this case, data having a size of $((t_L-t_0) \cdot b_0)$ does not reach the destination within the time limit $(=t_L-t_0)$, and reaches the destination after the deadline time $t_L$.

In the scenario illustrated in FIG. 1B, a marginal time $(=t_L-t_L')$ is provided prior to the deadline time $t_L$, in consideration of a possible drop in the transmission rate during transmission, and, at an initial stage, an amount of data (i.e., the area hatched in FIG. 1B) is estimated that is likely to be sent to the destination by an advanced deadline time $t_L'$.

If an actual drop in the transmission rate during transmission is just a little larger than expected, then the initially estimated amount of data reaches the destination at a time that is not so late after the advanced deadline time $t_L'$. In this case, the initially estimated amount of data $(=(t_L'-t_0) \cdot b_0)$ is not successfully sent to the destination by the advanced deadline time $t_L'$, but is highly likely to be successfully sent to the destination by the deadline time $t_L$. This approach illustrated in FIG. 1B allows the data transmission to be completed by the deadline time $t_L$, even in the presence of a drop in the transmission rate, as opposed to the approach illustrated in FIG. 1A.

FIGS. 1C and 1D illustrate two scenarios where the transmission rate tends to show a relatively large drop. The possible reasons why the transmission rate drops largely include network disconnection, data congestion for a long term, and the like.

Like the scenario of FIG. 1B, in the scenario of FIG. 1C, the marginal time $(=t_L-t_L')$ is provided prior to the deadline time $t_L$, but the time limit $(t_L'-t_0)$ is determined to be shorter than in FIG. 1B, and therefore, the advanced deadline time $t_L'$ is determined to be closer to the start time $t_0$ than in FIG. 1B, in consideration of a relatively large possible drop in the transmission quality in network. For these reasons, it is required to estimate initially an amount of data $(=(t_L'-t_0) \cdot b_0)$ that can reach the destination by the advanced deadline time $t_L'$, so that the initially estimated amount can be significantly small.

If, however, the actual network quality does not drop largely in the middle of the transmission period, as expected, the data reaches the destination very earlier than the deadline time $t_L$, because the amount of the data that was actually sent is very small to reflect the initially estimated amount of data. As a result, this approach cannot allow the data transmission to make much use of the total length of an available time given.

In contrast, like in FIG. 1B, in the scenario of FIG. 1D, the marginal time ($=t_L-t_L'$) is provided prior to the deadline time $t_L$, such that the marginal time is relatively small. Further, the network quality is monitored during transmission, and only when the network quality drops largely, the amount of data to be sent is reduced.

If it is found that, at a time t, the network quality had undergone a large drop, an initial value of the amount of data which had been estimated, at the start time $t_0$, to have (($t_L'$-t)·$b_0$) (i.e., the amount of data to be sent to the destination during a period from t to $t_L'$), is reduced (see the area hatched in FIG. 1D), so that the data transmission can be completed by the deadline time $t_L$.

This approach allows the data transmission to be completed by the deadline time $t_L$, even in the presence of a significant drop in the network quality in the middle of the transmission period. In the absence of a significant drop in the network quality in the middle of the transmission period, an amount of data ($=(t_L'-t_0)\cdot b_0$) can reach the destination by the deadline time $t_L$.

In the present embodiment, an amount of data transmitted is controlled depending on a change in the network quality, without requiring a user to configure the system settings at the start time $t_0$, by estimating and accounting for a later possible change in network quality. More specifically, the transmission rate is controlled to be dynamically changed, such that, when the network quality drop is small, as illustrated in FIG. 1B, an amount of data that can be transmitted is large, and when the network quality drop is large, as illustrated in FIG. 1D, an amount of data that can be transmitted is substantially maximized within the time limit.

Figure 2:
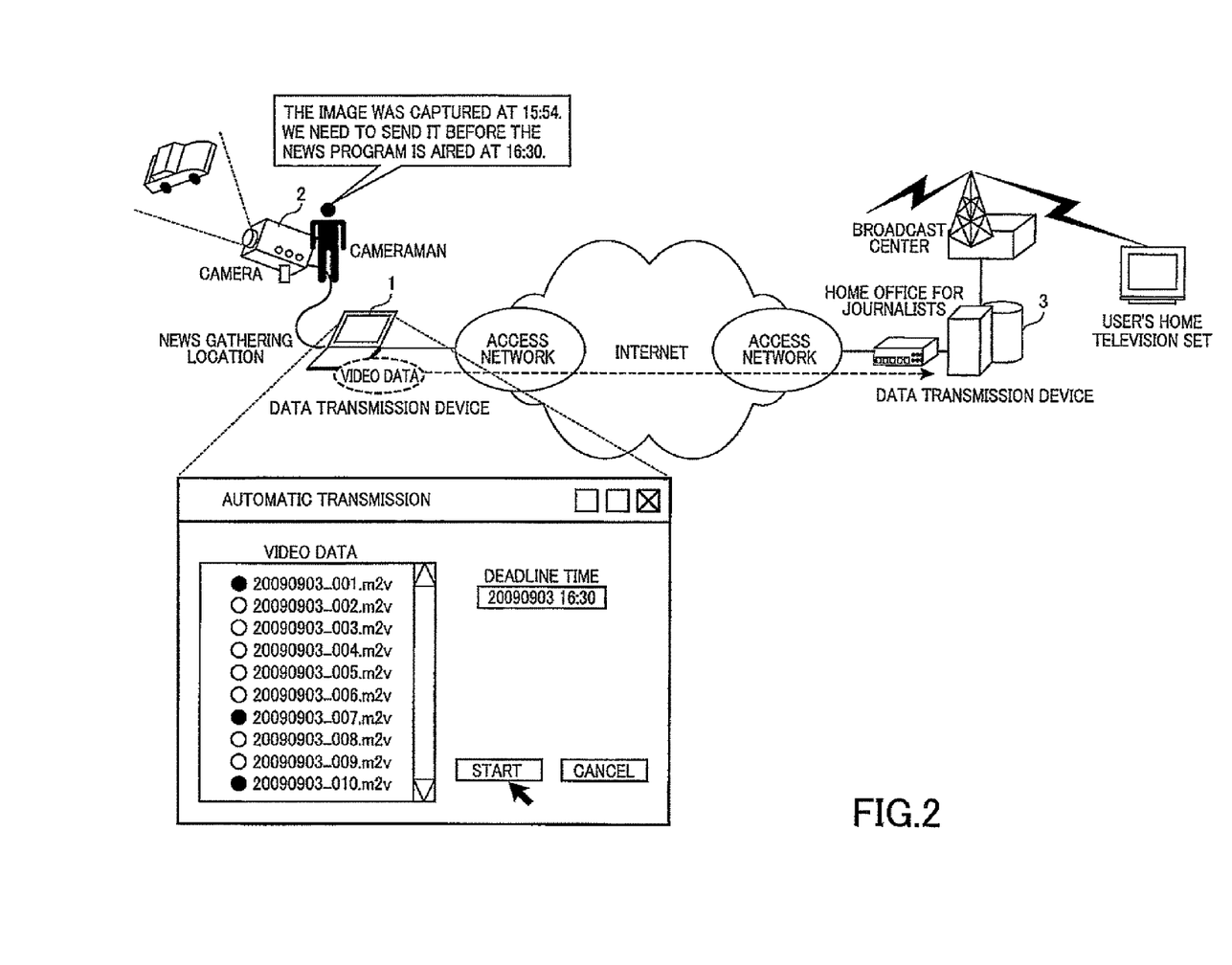
FIG. 2 is an view illustrating a system configuration of an entire system suitable for implementing a data transmission method according to the present embodiment of the present invention.

Referring next to FIG. 2, a system configuration is illustrated for a system according to the present embodiment of the present invention embodiment.

As illustrated in FIG. 2, for the present embodiment, a scenario is assumed in which news materials made of video data is delivered from a remote location where a field journalist is gathering news, to a home office for journalists. More specifically, in the scenario, there is a need for completing transmission of the video data which represents the news materials that are captured at the location at 15:54, to the home office for journalists by 16:30, so as to be in advance of air deadline of a news program (or another deadline which allows for before-air preparation such as editing of the materials for the news program). In this scenario, a data transmission device 1 on the side of the remote location for news gathering sends the video data to a data reception device 3 on the side of the home office for journalists, via access networks and the Internet.

As illustrated in FIG. 2, the remote location for news gathering is captured using a camera 2. The camera 2, which has a built-in microphone unit, creates the video data in the format also containing audio data. The camera 2, which is connected with the data transmission device 1 via a cable, transfers the captured video data (i.e., an exemplary original data set) to the data reception device 3. The connection between the camera 2 and the data transmission device 1 is compatible with, for example, IEEE 1394 (i.LINK/FireWire).

The data transmission device 1 on the side of the remote location for news gathering and the data reception device 3 on the side of the home office for journalists are connected with the Internet via access networks. The access networks are, for example, a wired or wireless LAN (Local Area Network), a data communication network for mobile phones, a WiMAX (Worldwide Interoperability for Microwave Access), a satellite communication network such as a BGAN (Broadband Global Area Network), or the like.

The data transmission device 1 encodes the video data received from the camera 2, and sends the encoded data to the data reception device 3 via the Internet. In the aforementioned scenario, the data transmission device 1 is instructed to encode the video data and send the encoded data, by a deadline time $t_L$ identified by a user (e.g., a field reporter or a field broadcast journalist). In an example depicted in FIG. 2, the deadline time $t_L$ is 16:30, and a time limit ($=t_L-t_0$) is 36 minutes (=16:30−15:54).

Because the video data is intended for being broadcast, the encoding of the video data is desired to have the best possible quality. The quality depends on a selection of encoding parameters used for the video data. As such, a process is desired to be completed within 36 minutes, to encode the video data using an encoding parameter which can provide the best possible quality, and send the encoded data.

It is added that, although, in the description, the data transmission device 1 is configured to include a built-in communication interface in connection with one of the access networks, a network connection device may be added, as a separate device, on to the data transmission device 1.

Additionally, the data transmission device 1 and the camera 2 may be combined into a single unit.

Still additionally, the data transmission device 1 is configured to receive the video data from the camera 2, but the data transmission device 1 is not limited to this configuration. The data transmission device 1 may be alternatively configured to receive the video data from an external storage media device such as a USE (Universal Serial Bus) memory, an external hard-disc, a video tape or the like.

In addition, the data transmission device 1, in the form of, for example, a personal computer or a special-purpose terminal, operates to cause a processor to execute application software for encoding and sending the video data. Similarly, the data reception device 3, in the form of, for example, a personal computer or a special-purpose terminal, operates to cause a processor to execute application software for receiving the encoded data.

As illustrated in FIG. 2, the data transmission device 1 displays to a cameraman (e.g., a field reporter or a user) at the scene to be captured, a user interface page on a display screen. On the page, a list of video data sets, which are user-selectable, is displayed within a left-hand box, and a deadline time (e.g., a date and a time of the day) is entered at an upper-right-hand box. According to the instructions on the user interface page, the user can select one of the listed video data sets, and designate the deadline time.

It is added that, in the present embodiment, the deadline time is identified by direct entry of the deadline time, but the deadline time may be identified by entry of a time difference between a current time (i.e., a start time) and the deadline time (i.e., an end time), which refers to a time limit.

Once the user presses a "start" bottom on the user interface page, the data transmission device 1 starts data processing including encoding operation and sending operation.

Figure 3:
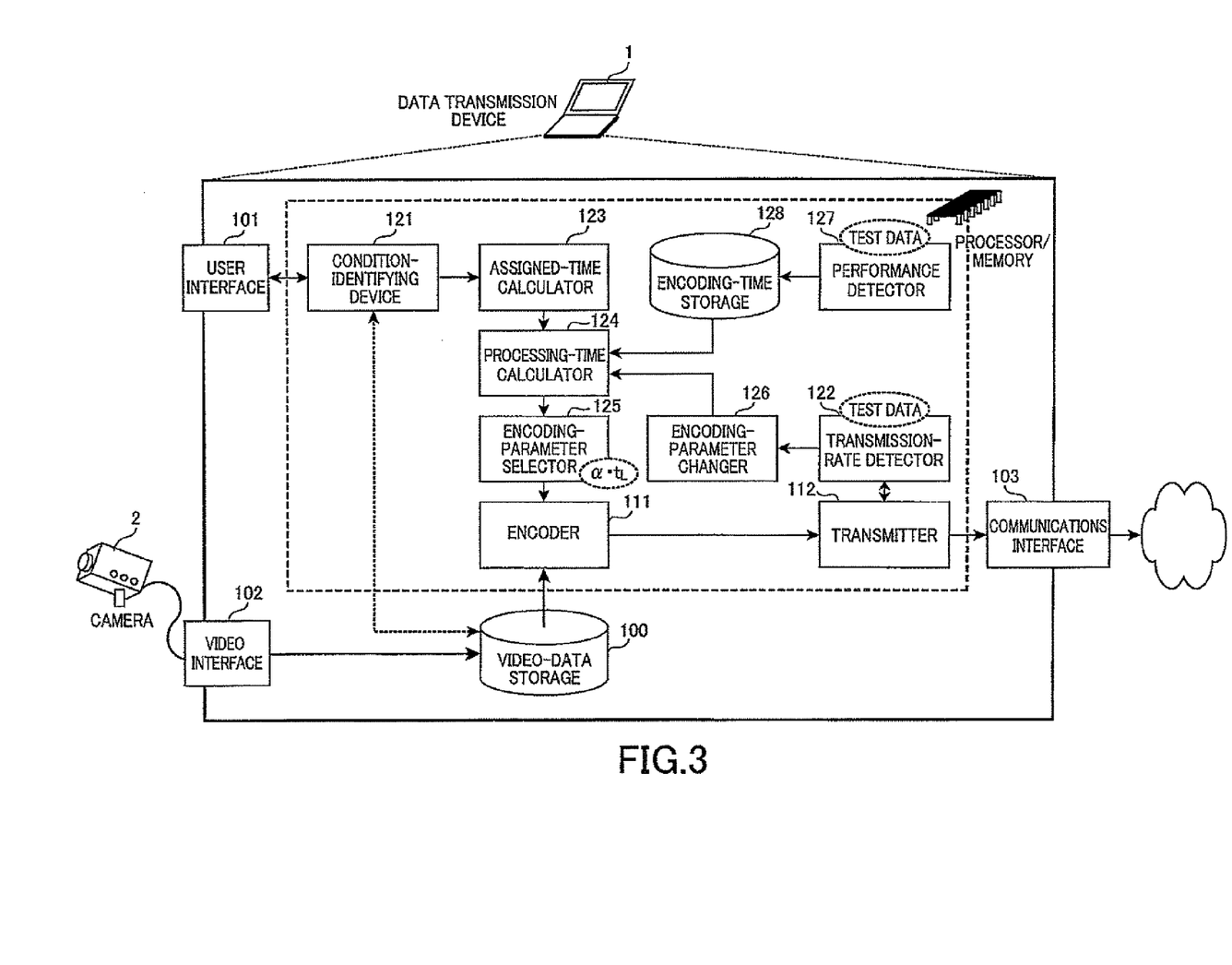
FIG. 3 is a functional block diagram illustrating a data transmission device depicted in FIG. 2.

Referring next to FIG. 3, the data transmission device 1 is illustrated in functional block diagram.

As illustrated in FIG. 3, the data transmission device 1 is configured to include: a video-data storage 100; a user interface 101; a video-data interface 102; and a communications interface 103.

The user interface 101 includes a display presenting an image to the user, and a user-manipulation interface (e.g., a mouse and/or a keyboard) which allows the user to enter information. The display displays the user interface page such as illustrated in FIG. 2. The user-manipulation interface receives from the user, video data to be sent and information including the deadline time.

The video-data interface 102 receives video data from the camera 2 which is connected therewith via a cable, and outputs the video data to the video-data storage 100 for storage.

The communications interface 103, in connection with one of the access networks, sends encoded video-data to the data reception device 3.

The video-data storage 100 stores to a mass storage (now shown) video data (i.e., exemplary original data) which has been inputted from the video-data interface 102.

In addition, as illustrated in FIG. 3, the data transmission device 1 is further configured to also include: an encoder 111; a transmitter 112; a condition identifying-device 121; a transmission-rate detector 122; an assigned-time calculator 123; a processing-time calculator 124; an encoding-parameter selector 125; an encoding-parameter changer 126; a performance detector 127; and an encoding-time storage 128. These functional features are implemented by causing a processor using a memory, to execute a pre-selected program. The processor and the memory are mounted in the data transmission device 1, as illustrated in FIG. 3.

The encoder 111 encodes video data (i.e., exemplary original data) inputted from the video-data storage 100, using one of a plurality of parameter sets which is selected by the encoding-parameter selector 125. Each parameter set includes at least one encoding parameter. The encoded data is outputted to the transmitter 112.

The transmitter 112 transmits the encoded data to the data reception device 3 via the communications interface 103.

The performance detector 127 causes the encoder 111 to actually encode a given amount of test data using a successively-selected one of the plurality of parameter sets, on a per-parameter-set basis, and measures an encoding time to encode the test data. Based on the measurements, the performance detector 127 then obtains an encoding time to encode a portion of the video data which is worth a unit size (alternatively, a unit time). The reason is that the length of the encoding time depends on the processing capacity of the processor or a chip set mounted in the data transmission device 1 which can vary between individual data transmission devices 1. This initial and actual encoding process for the test data allows a precise measurement of the encoding time of the test data.

It is added that each parameter set includes at least one encoding parameter, and the parameter sets have different combinations of encoding parameters, and/or different specific values of the same combinations of encoding parameters.

The at least one encoding parameter includes one or more of the followings:
a video format;
an image size (image resolution);
a frame rate;
a bit rate for encoding;
a ratio of frames to be encoded using intra-frame prediction in a spatial field;
a ratio of frames to be encoded using inter-frame prediction;
a size of search range for inter-frame prediction;
a size of quantization parameters;
a type of an algorithm for inter-frame prediction;
a factor for pixel subsampling;
a factor for chroma subsampling;
a number of frames per a unit time;
a type of an encoding algorithm for data compression; and
a type of frequency transformation of pixels.

The performance detector 127 is required to measure encoding times for the test data, on a per-parameter-set basis. When there are a number of parameter sets, the performance detector 127 may alternatively estimate an encoding time of one of the parameter sets, from the actual measurement of the encoding time of another parameter set. This eliminates the need for actually measuring the encoding times for all the parameter sets.

In an alternative implementation in which a parameter set includes a plurality of encoding parameters, and one of the encoding parameters has a larger impact on the encoding time of the entirety of the parameter set, the performance detector 127 may estimate the encoding time of the parameter set from the actual measurement of the encoding time of the influential encoding parameter.

In a still alternative implementation, the performance detector 127 estimates the encoding times of some of the parameter sets from the actual measurements of the encoding times of other parameter sets, by such as linear interpolation.

As long as the hardware configuration of the data transmission device 1 remains unchanged, it can be said that the performance of the data transmission device 1 is maintained, with the result that it is adequate for the performance detector 127 to measure the encoding times only once at the beginning of one period of operation of the data transmission device 1.

On the other hand, if the hardware configuration of the data transmission device 1 changes, the performance detector 127 is preferably activated again during the same period of operation.

In addition, when the data transmission device 1 is a personal computer, and the number of programs currently executed changes with time in the personal computer, it can be considered that also the performance of the data transmission device 1 changes. In this case, the performance detector 127 is preferably activated at time intervals during the same period of operation.

Figure 7:
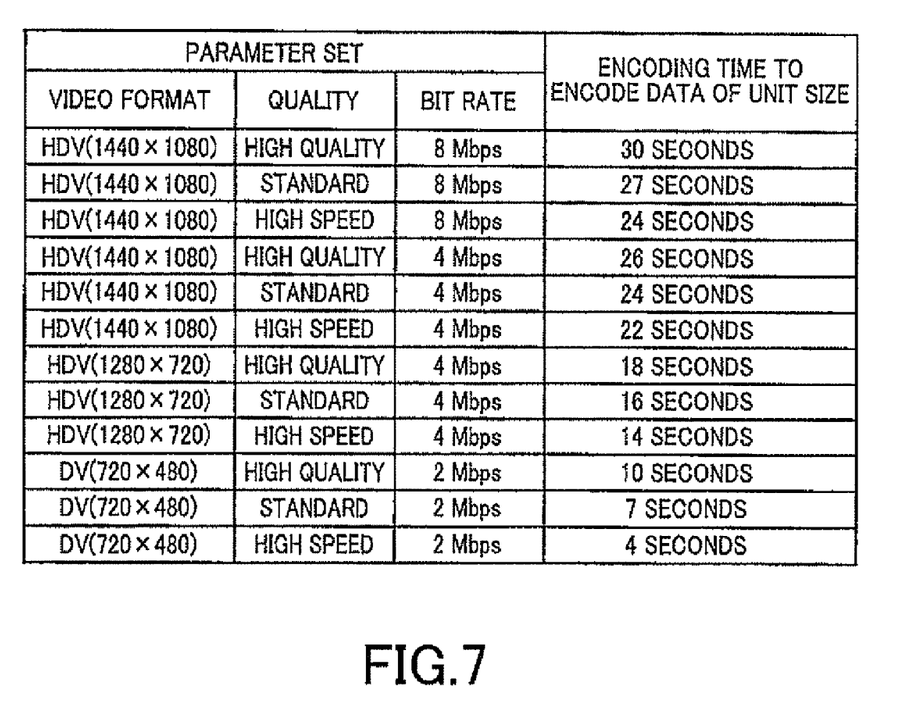
FIG. 7 is a table illustrating an example of a collection of a plurality of parameter sets.

A table of FIG. 7 indicates an example of the measurements of the encoding times obtained by the performance detector 127. The encoding times refer to times to encode a unit-size-worth portion of the video data. The unit size may be defined on a time length basis, such as data worth 1 [second], or on a digital data quantity basis of the video data.

In the example illustrated in FIG. 7, there are a plurality of parameter sets, and each parameter set includes three encoding parameters, that is, a video format, an image quality for encoding, and a bit rate for encoding, as elaborated below.

In the example illustrated in FIG. 7, the video formats of the video data include a DV (Digital Video) format of an image size of 720×480, an HDV (High Definition Video) format of an image size of 1280×720, and another HDV (High Definition Video) format of an image size of 1440×1080.

The DV format is a format for recording video on a video tape recorder (VTR), in which the frame rate is 30 [frame/second], and the compression ratio is 1/5.

The HDV format is a format for recording of digital video, which allows video to be recorded with high quality comparable to that of HDTV (High Definition TV). The HDV format uses MPEG-2 for compression of video data. HDV 1080i allows recording of interlaced video using 1080 scan-lines (1440×1080 pixels), while HDV 720p allows recording of progressive-scan video using 720 scan-lines (1280×720 pixels).

The video formats that can be used in the present embodiment are not limited to the above formats, not to mention, and may alternatively or additionally include a non-compression video data format, an AVCHD (Advanced Video Codec High Definition) format, or other video formats.

In the example illustrated in FIG. 7, there are three levels of the image quality for encoding, as follows:

High Speed: an encoding time is shorter, but video quality is lower,

Standard: an encoding time and video quality are intermediate between High Speed and High Quality, and High Quality: an encoding time is longer, but video quality is higher.

In the example illustrated in FIG. 7, there are three types of bit rates for encoding, that is, 8 [Mbps], 4 [Mbps] and 2 [Mbps].

It is added that the number of encoding parameters included in each parameter set may be larger than three.

The encoding-time storage 128 stores the encoding times obtained by the performance detector 127, on a per-parameter-set basis. The encoding-time storage 128 is referenced by the processing-time calculator 124.

The condition-identifying device 121 identifies a video data set (i.e., an exemplary original data set) for which data processing is to be initiated at a start time $t_0$, and identifying a deadline time $t_L$ by which the data processing is to be completed. The data processing, as described below by reference to FIGS. 4A and 4B, includes a data encoding step and a data sending step both of which can be performed at least in part simultaneously or with a time delay therebetween. The video data set is one video data sub-set or a sequence of two or more video data sub-sets such as illustrated in FIG. 5.

Conditions including the identify of the video data set and the deadline time may be conditions which are entered, at the time of the data processing, by the user's direct manipulation on the user interface page (see FIG. 2), or alternatively, may be conditions which have been previously stored in the data transmission device 1. The video data set is stored in the video-data storage 100 of the data transmission device 1. The deadline time is a point of time by which the entire data processing has to be finished for the entire video date set, which is a user-selected one of a plurality of video data sets illustrated in FIG. 2.

The transmission-rate detector 122 measures the transmission rate of network transmission up to the data reception device 3, by a measuring technique such as a packet pair technique, a packet train technique, or the like.

In an alternative implementation, for the transmission rate to be measured, the data transmission device 1 actually sends a large quantity of test data at a time to the data reception device 3, and measuring the transmission rate as a function of the amount of data that the data reception device 3 has received. In an example of this implementation, after the data transmission device 1 sends test data for a time duration having a length ranging from several seconds to tens of seconds, at a bit rate of 10 Mbps, if the data reception device 3 receives the test data at a bit rate of 3 Mbps, then the measurement of the transmission rate turns to be 3 Mbps.

In an event of a long-term transmission, a situation can exist in which a network transmission rate varies between time zones. The reason is that, depending on a time zone in which the user works on a daily basis, or a time zone in which the user uses the network, the amount of data flowing over the network varies between different time zones within one day. For measurement of the network property for a long-term transmission, it is preferable to send text data for a relatively long term in advance, and to obtain a rough image about the network property.

The assigned-time calculator 123 calculates an assigned time of each video data sub-set, within a time limit ($=t_L-t_0$) of the video data set, on a per-data-sub-set basis. More specifically, the assigned-time calculator 123 calculates, when the video data set is a sequence of a plurality of video data sub-sets which are mutually different in, for example, an image size and/or a play-back time, the assigned-times of these video data sub-sets, so that these video data sub-sets can be assigned respective processing times each including an encoding time and a sending time, in order to optimize the assignment of individual processing times to the video data sub-sets. Still more specifically, the assigned-time calculator 123 calculates the assigned times of the video data sub-sets, based on one or more of the followings: a play-back-time ratio, an image-size ratio, a frame-rate ratio, and a bit-rate ratio between the video data sub-sets, on a per-data-sub-set basis.

How to calculate the assigned times will be elaborated below by way of three examples.

Example 1

Figure 8A:
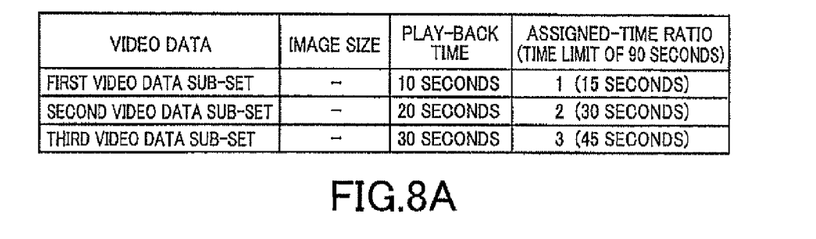
FIG. 8A is a table illustrating an example of calculation of the length of an assigned time.

As illustrated in FIG. 8A, in this example in which first through third video data sub-sets share the same image size, an assigned-time ratio of each data sub-set is calculated based on the play-back times of the three data sub-sets.

In this example illustrated in FIG. 8A, the three data sub-sets share the same image size (image resolution), while the three data sub-sets have different play-back times. It is presupposed that the three sub-sets have a time limit of 90 [second] in total. Depending on the ratio of the play-back time of each data sub-set to those of the remaining data sub-sets, the first data sub-set has an assigned time of 15 [second] (the ratio of the assigned time: 1/6), the second data sub-set has an assigned time of 30 [second] (the ratio of the assigned time: 2/6), and the third data sub-set has an assigned time of 45 [second] (the ratio of the assigned time: 3/6). The reason is that, as long as the image size is the same, the longer the play-back time, the longer the encoding time, the larger the size of the encoded data.

Example 2

Figure 8B:
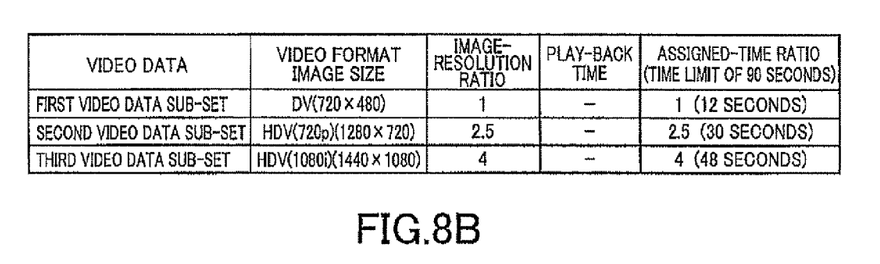
FIG. 8B is a table illustrating an alternative example of calculation of the length of the assigned time.

As illustrated in FIG. 8B, in this example in which first through third video data sub-sets share the same play-back time, an assigned-time ratio of each data sub-set is calculated based on the image sizes of the three data sub-sets.

In this example illustrated in FIG. 8B, the three data sub-sets share the same play-back time, while the three data sub-sets have different image sizes. It is presupposed that the three data sub-sets have a time limit of 90 [second] in total. Depending on the ratio of the image size (image resolution) of each data sub-set to those of the remaining data sub-sets, the first data sub-set has an assigned time of 12 [second] (the ratio of the assigned time: 1/7.5), the second data sub-set has an assigned time of 30 [second] (the ratio of the assigned time: 2.5/7.5), and the third data sub-set has an assigned time of 48 [second] (the ratio of the assigned time: 4/7.5). The reason is that, as long as the play-back time is the same, the larger the image size, the longer the encoding time, the larger the size of the encoded data.

Figure 8C:
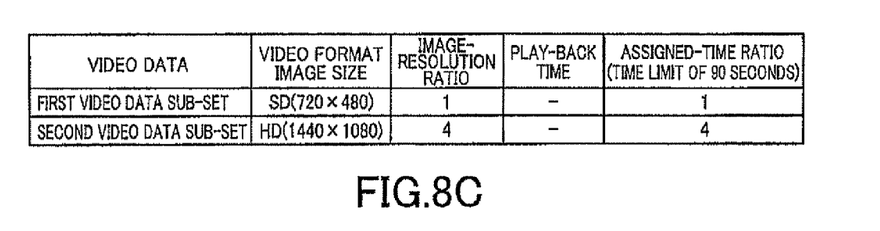
FIG. 8C is a table illustrating a still alternative example of calculation of the length of the assigned time.

In an alternative example illustrated in FIG. 8C in which first and second video data sub-sets have different video formats, for example, an SD (Standard Definition) and an HD (High Definition), the assigned-time ratio of each data sub-set can be calculated in the same manner as described above.

Example 3

Figure 8D:
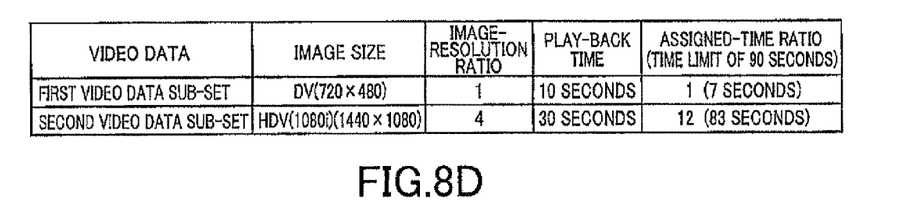
FIG. 8D is a table illustrating a yet alternative example of calculation of the length of the assigned time.

As illustrated in FIG. 8D, in this example in which first and second video data sub-sets have different image sizes and different play-back times, an assigned-time ratio of each data sub-set is calculated based on the image sizes and the play-back times of the two data sub-sets.

The approach in which the assigned times are calculated in this example is a combined approach of the approach taken in Example 1 and the approach taken in Example 2.

In this example illustrated in FIG. 8D, the image size (HDV(1080i) (1440×1080)) of the second data sub-set is four times as large as the image size (DV(720×480)) of the first data sub-set, and the play-back time (30 [second]) of the second data sub-set is three times as large as the play-back time (10 [second]) of the first data sub-set. As a result, in an event where the time limit has 90 [second], the first data sub-set has an assigned time of 7 [second] (the ratio of the assigned time 1/13), and the second data sub-set has an assigned time of 83 [second] (the ratio of the assigned time: 12/13).

It is added that, in an alternative implementation, the ratio of the assigned time of each video data sub-set (i.e., an exemplary original data sub-set) to those of other video data sub-sets may be calculated by considering a ratio of an additional factor including a frame rate or a bit rate or both of each data sub-set, in addition to ratios of the above mentioned factors, for example, a video format, an image size, and a play-back time.

The processing-time calculator 124 calculates an estimate of an individual processing time $T_P$ to encode and send each data sub-set using a successively-selected one of the plurality of encoding parameter sets, per each data sub-set, based on the assigned time for the each data sub-set, an estimate of an encoding time $T_E$ to encode the each data sub-set using the successively-selected one encoding parameter set, and an estimate of a sending time $T_T$ to send the encoded data sub-set at a transmission rate.

The processing time of each video data sub-set is not allowed to exceed the assigned time of each video data sub-set. The processing-time calculator 124 accesses the encoding-time storage 128, in search of an encoding time.

The processing-time calculator 124 calculates an estimate of an encoding time of each video data sub-set, as follows:

Encoding time=Encoding time of unit-size-worth data, stored in encoding-time storage×Size of each video data sub-set to be encoded and sent.

The processing-time calculator 124 calculates an estimate of a sending time of each video data sub-set, as follows:

Sending time=(Play-back time of each video data sub-set×Bit rate for encoding)/Transmission rate measured by transmission-rate detector.

It is added that (Play-back time of each video data sub-set× Bit rate for encoding) refers to the size of encoded data-sub-set.

In an example where a video data sub-set has a play-back time of 30 [second], the data sub-set is encoded at 1 {Mbps}, and a transmission rate of 2 [Mbps] is measured by the transmission-rate detector 122, the sending time is calculated by the following formula:

Sending time=(30 [second]×1 [Mbps])/2 [Mbps]=30 [Mbit]/2 [Mbps]=15 [second].

It is added that, for setting a bit rate for encoding, it is preferable to previously narrow the range of available bit rates such that the range has only optimum bit rates. In an example, there is a lower limit of the bit rates for ensuing a certain level of the resulting quality of a video image represented by the encoded video data, and there is also an upper limit of the bit rates above which there is no increase in the image quality.

Therefore, it is preferable to define the range of optimum bit rates in consideration of a range of bit rates which allow the resulting image quality to be maintained, and which does not make a portion of data encoded useless.

Next, there will be illustrated how the processing-time calculator 124 calculates an estimate of a processing time for one video data set to be encoded and sent.

FIG. 4 illustrates how to calculate a processing time for one video data set to be encoded and sent, when the one video data set is made of one video data sub-set.

In FIG. 4, one video data sub-set is encoded using a parameter set p. A processing time, that is, a time to process (encode and send) the video data sub-set is expressed using the followings:

$T_E(t_0, p)$: an encoding time, that is, a time to encode video data sub-set, which elapses from a start time $t_0$, using the parameter set p, $T_T(\text{encode}(p))$: a sending time, that is, a time to send or transfer the encoded data, and $T_P(t_0, p)$: a processing time, that is, a time to process the video data sub-set, from the start time $t_0$.

The processing-time calculator 124 calculates an estimate of the processing time $T_P$, according to the following algorithm, based on an estimate of the encoding time $T_E$ and an estimate of the sending time $T_T$, both of which are calculated in the manner described above:

1. When the data transmission device 1 implements an encoding operation and a sending or transferring operation separately (not simultaneously or in parallel)

The processing time $T_P$ is calculated by the following formula:

$$T_P = T_E + T_T$$

2. When the data transmission device 1 implements an encoding operation and a sending or transferring operation at least in part in parallel (1) When $T_E > T_T$, The processing time $T_P$ is calculated by the following formula:

$$T_P = \text{MAX}(T_E, T_T) + \Delta tE,$$

where,

MAX(a, b): one of a and b which is larger than another, and $\Delta tE$: a time difference between an end time of a preceding encoding-operation and an end time of a subsequent sending-operation.

It is added that, if $\Delta tE$ is too small to be noticeable, then $T_P = \text{MAX}(T_E, T_T)$.

(2) When $T_E < T_T$,

The processing time $T_P$ is calculated by the following formula:

$$T_P = \text{MAX}(T_E, T_T) + \Delta tS,$$

where, $\Delta tS$: a time difference between a start time of a preceding encoding-operation and a start time of a subsequent sending-operation.

It is added that, if $\Delta tS$ is too small to be noticeable, then $T_P = \text{MAX}(T_E, T_T)$.

Figure 4A:
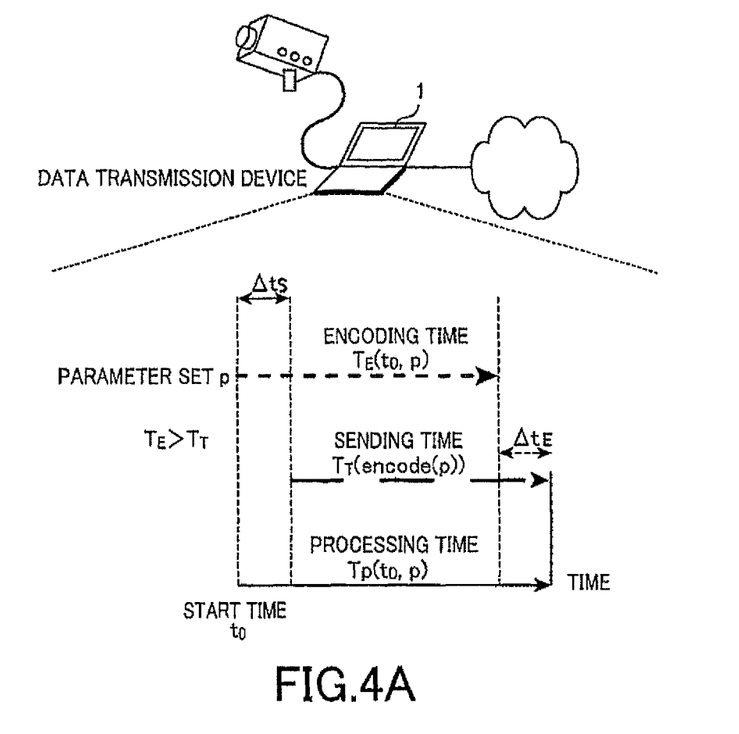
FIG. 4 is a view for explanation of calculation of a processing time of one video data sub-set, in the present embodiment.
Figure 5:
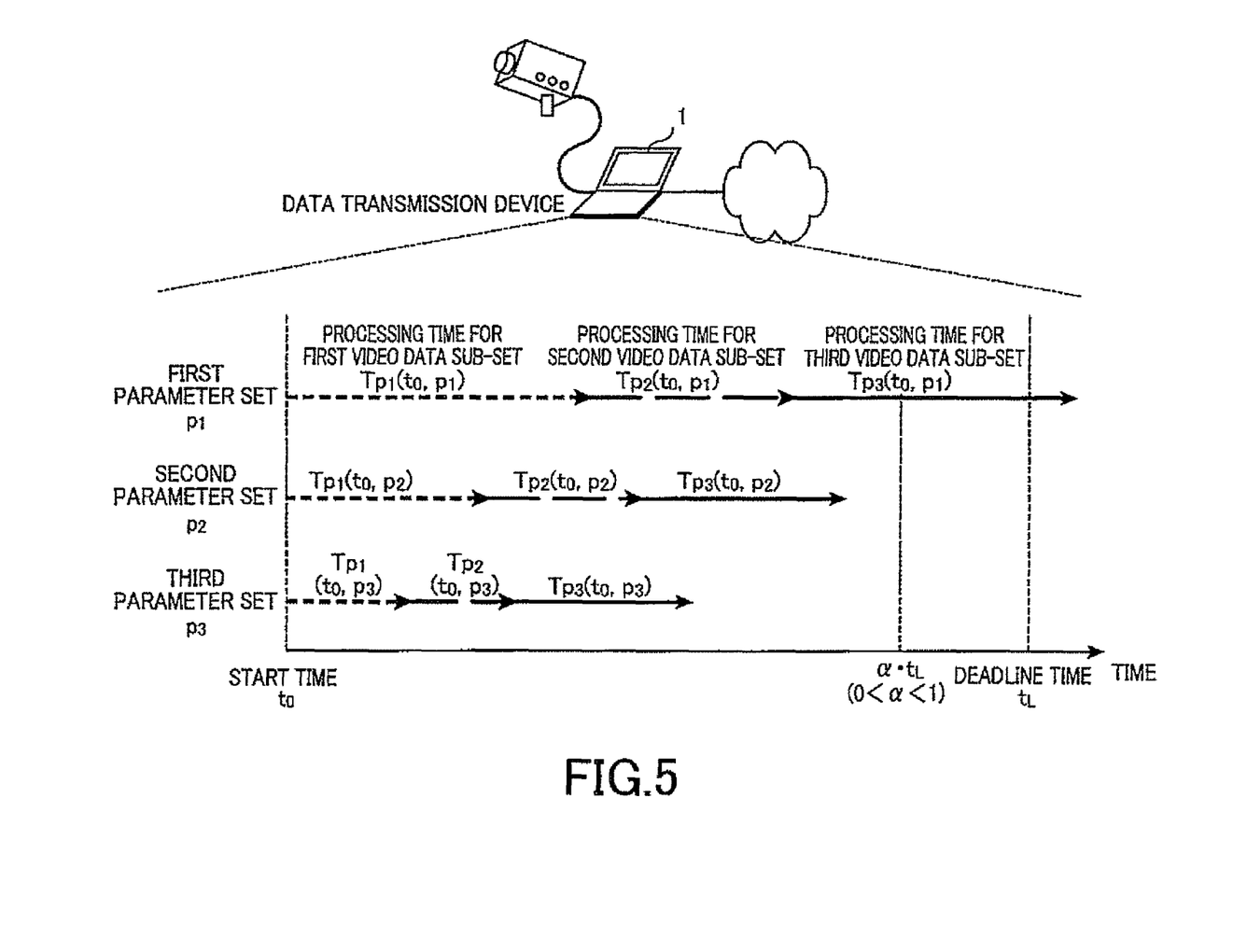
FIG. 5 is a view for explanation of calculation of a processing time of a plurality of video data sub-sets, in the present embodiment.

FIG. 4A illustrates a case of $T_E > T_T$. In this case, each time an integral amount of data which has been encoded reaches a unit amount which can be sent, the integral amount of data is sent to the destination. That is, the sending operation ends at a time which is $\Delta tE$ later than the end time of the encoding operation. Therefore, if $\Delta tE$ is significantly small, then $T_P$ is substantially equal to $T_E$.

Figure 4B:
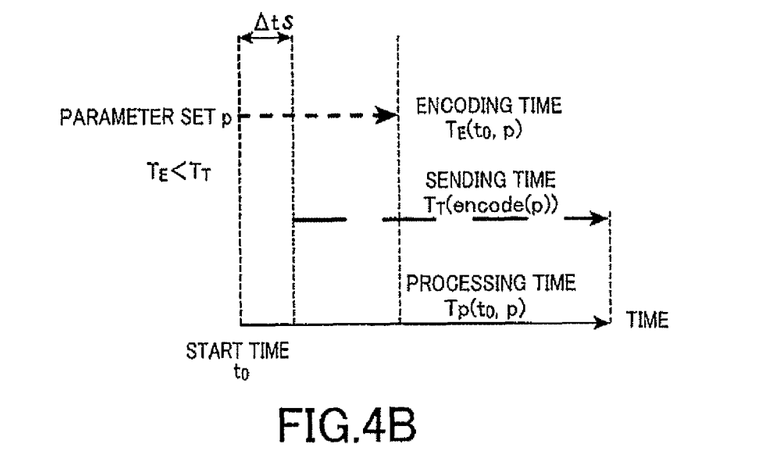

FIG. 4B illustrates a case of $T_E<T_T$. This case occurs when, for example, because a signal travels in the network at a low speed, the amount of data to be sent per unit time is smaller than the amount of data to be encoded per unit time. In this case, the sending operation starts at a time which is ΔtS later than the start time of the encoding operation. Therefore, if ΔtS is significantly small, then $T_P$ is substantially equal to $T_T$.

Next, there will be elaborated how the encoding-parameter selector 125 selects one of the plurality of parameter sets.

The encoding-parameter selector 125 selects one of the plurality of encoding parameter sets to allow a total processing time $\Sigma T_P$ not to exceed the time limit ($=t_L-t_0$).

In this regard, the total processing time $\Sigma T_P$, if the video data set is one data sub-set, is equal to an individual processing time for the one data sub-set, or if the video data set includes a sequence of two or more data sub-sets, is equal to a sum of individual processing times for the two or more data sub-sets.

In a preferable implementation, the encoding-parameter selector 125 selects one of the plurality of parameter sets, which allows the total processing time $\Sigma T_P$ falls within a shortened time limit ($=\alpha \cdot t_L-t_0$, $0<\alpha<1$) that is equal to the original time limit ($=t_L-t_0$) minus a marginal time. In a more preferable implementation, the encoding-parameter selector 125 selects one of the plurality of parameter sets, which allows the total processing time $\Sigma T_P$ to end at a time closer to an advanced deadline time ($=\alpha \cdot t_L$), than any other parameter sets.

Addition of such a marginal time prevents, as much as possible, the video data from reaching the data reception device 3 at a time later than the deadline time, due to temporal changes in the transmission rate.

More specifically, the encoding-parameter selector 125 selects one of the plurality of parameter sets so as to provide the total processing time $\Sigma T_P$ which satisfies the following formula, and which is closer to $\alpha \cdot T_R(t_0)$ than any other parameter sets:

$$\Sigma_{i=1}^{n} T_{Pi}(t_0, p_a) <= \alpha \cdot T_R(t_0),$$

where,

α: a real value within $0<\alpha<1$, and $T_R(t)$: a remaining time, which refers to a portion of the time limit which has not been expired at a time t (when $t=t_0$, the remaining time $T_R(t_0)$ is equal to $(t_L-t_0)$).

FIG. 5 illustrates how to calculate the total processing time $\Sigma T_P$ for one video data set to be encoded and sent, when the one video data set is made of first through third video data sub-sets.

FIG. 5 illustrates the total processing time $\Sigma T_P$ for the entire video data set encoded using a first parameter set p1 (shown at the upper), the total processing time $\Sigma T_P$ for the same video data set encoded using a second parameter set p2 (shown at the middle), and the total processing time $\Sigma T_P$ for the same video data set encoded using a third parameter set p3 (shown at the bottom).

The three parameter sets p1-p3 are distinguished as follows:

p1: The quality is higher, the encoding time is longer, the encoded data is larger in size, p2: The quality, the encoding time and the size of the encoded data are middle, and p3: The quality is poorer, the encoding time is shorter, the encoded data is smaller in size.

In an example illustrated in FIG. 5, selection of the first parameter set p1 fails to satisfy the above-mentioned formula, while selection of the second and third parameter sets p2 and p3 satisfy the formula. When the second parameter set p2 is selected, the total processing time $\Sigma T_P$ for the entire video data set is closer to $\alpha \cdot T_R(t_0)$, and it ends at a time closer to the is the advanced deadline time ($=\alpha \cdot t_L$), than when the third parameter set p3 is selected. For this reason, in this example, the second parameter set p2 is selected as an optimum parameter set for the video data set.

In an exemplary implementation in which there are "n" video data sub-sets, "m" video data sub-sets within which are HD (High Definition) materials, and "n-m" video data sub-sets within which are SD (Standard Definition) materials, the encoding-parameter selector 125 selects different parameter sets between these video data sub-sets, so as to satisfy the following formula:

$$\Sigma_{i=1}^{m} T_{Pi}(t_0, p_a) + \Sigma_{i=m+1}^{n} T_{Pi}(t_0, p_b) <= \alpha \cdot T_R(t_0).$$

The encoding-parameter changer 126 activates the processing-time calculator 124 and the encoding-parameter selector 125 again, at a time when the transmission-rate detector 122 measures the transmission rate lower than a predetermined threshold, during a process of sending the encoded data, and/or at a time when an integral amount of data that was sent for a given time period becomes smaller by above a predetermined value, than an initially-estimated amount of data, during a process of sending the encoded data. The reason is that a drop in the transmission rate during a transmission session can cause the video data to reach the destination at a time later than the deadline time.

Also to this end, the transmission-rate detector 122 preferably measures the transmission rate periodically, and/or the transmission-rate detector 122 measures the transmission rate, at one or more of the following timings:

a time when encoding the video data set is completed, a time during which encoded data is being sent, and a time when sending the encoded data is completed.

The encoding-parameter changer 126 operates in a manner described below. In an exemplary scenario, it is presupposed that the transmission of "n" video data sub-sets has started, and, at a time t during the course of the transmission, "j" ($<n$) video data sub-sets of the "n" video data sub-sets have been transmitted. In this case, the remaining time $T_R(t)$ is the deadline time minus a current time t, as follows:

$$T_R(t)=t_L-t.$$

It is presupposed that, at a time when the remaining time $T_R(t)$ exists, the encoding-parameter changer 126 determines that, continued selection of the same parameter set as a previous one ($=p_a$) would cause the video data to reach the destination at a time later than the deadline time. In this case, the encoding-parameter changer 126, through update of parameter sets, changes the parameter set $p_a$ into a new parameter set $p_a'$, for the subsequent video data sub-sets (i.e., the (k+1)th video data sub-set and the following sub-sets). The new parameter set $p_a'$ allows the processing time to be shorter than when the parameter set $p_a$ is kept on being used. This is expressed by the following formula:

$$\Sigma_{i=1}^{k} T_{Pi}(t, p_a) + \Sigma_{i=k+1}^{n} T_{Pi}(t, p_a') <= \alpha \cdot T_R(t).$$

The encoding-parameter changer 126 selects a new parameter set which can satisfy the above formula.

This approach allows the data transmission device 1 to be resistant to a possible drop in the transmission rate in network, which is worth a reduction time expressed by the following formula:

$$\text{Reduction time} = \Sigma_{i=k+1}^{n} T_{Pi}(t, p_a) - \Sigma_{i=k+1}^{n} T_{Pi}(t, p_a').$$

It is added that, in an alternative implementation, the encoding-parameter changer 126 estimates the transmission rate at a subsequent time, based on measurements of the transmission rate occurring at previous times. In this implementation, the subsequent transmission rate can be estimated from a time history of changes in the previous measurements of the transmission rate, without requiring the use of a measurement of a transmission occurring at a current time, and an optimum and new parameter set can be selected as a function of the estimated subsequent-transmission-rate.

Figure 6:
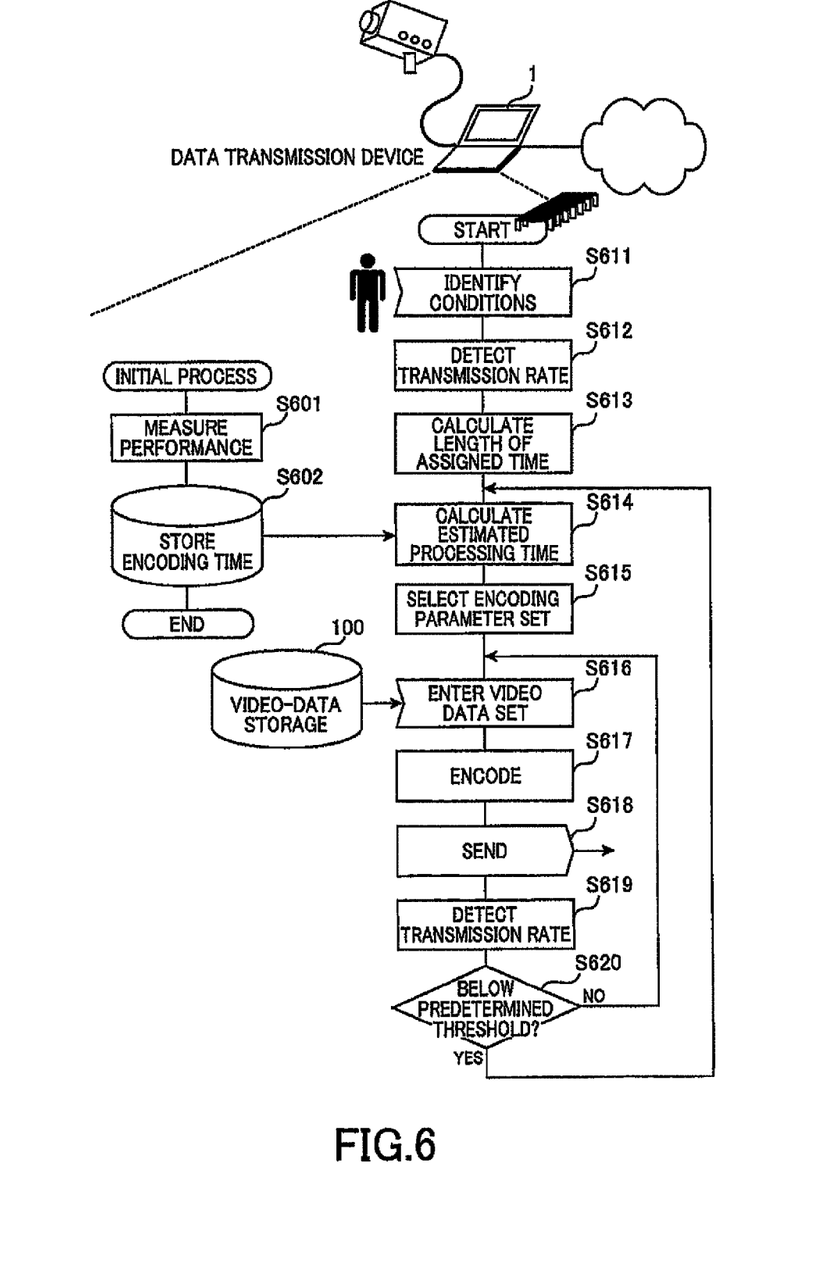
FIG. 6 is a flow chart conceptually illustrating a program executed in the data transmission device depicted in FIG. 3.

FIG. 6 illustrates conceptually in flow chart a program executed by the processor to implement the data transmission method according to the present embodiment.

(S601) At an initial step, predetermined test data is encoded on a per-parameter-set basis, the encoding time is measured on a per-parameter-set basis, and, based on the measured encoding-time, an encoding time to encode data having a unit size is obtained or calculated in association with a corresponding one of the plurality of parameter sets. This step is implemented by the performance detector 127 illustrated in FIG. 3.

(S602) The thus-obtained encoding times are stored in the encoding-time storage 128 illustrated in FIG. 3, in association with the respective parameter sets.

(S611) The user identifies a video data set which is to be encoded and sent to the data reception device 3, and a deadline time $t_L$ by which the data processing (encoding and sending) is to be completed. In this regard, the video data set is one data sub-set or a sequence of two or more data sub-sets. This step is implemented by the condition-identifying device 121 illustrated in FIG. 3.

(S612) The transmission rate in network is measured at or before a start time $t_0$. This step is implemented by the transmission-rate detector 122 illustrated in FIG. 3.

(S613) The length of an assigned time is calculated per each data sub-set, which does not exceed a time limit $(=t_L-t_0)$ for the video data set. This step is implemented by the assigned-time calculator 123 illustrated in FIG. 3.

(S614) An estimate of an individual processing time $T_P$ to encode and send each data sub-set using a successively-selected one of the plurality of encoding parameter sets, is calculated per each data sub-set, based on the assigned time for the each data sub-set, an estimate of the encoding time $T_E$ to encode the each data sub-set using the successively-selected one encoding parameter set, and an estimate of the sending time $T_T$ to send the encoded data sub-set at a transmission rate. This step is implemented by the processing-time calculator 124 illustrated in FIG. 3.

(S615) One of the plurality of encoding parameter sets for the encoder 111 is selected which allows the total processing time $\Sigma T_P$ not to exceed the time limit $(=t_L-t_0)$. This step is implemented by the encoding-parameter selector 125 illustrated in FIG. 3.

(S616) The video data set to be encoded and sent is inputted from the video-data storage 100.

(S617) The inputted video data set is encoded using the selected parameter set, by the encoder 111 illustrated in FIG. 3.

(S618) The encoded data is sent or transferred to the data reception device 3 through the transmitter 112 illustrated in FIG. 3.

(S619) The transmission rate is measured while the encoded data is being sent to the data reception device 3 over the network.

(S620) It is determined whether the measured transmission rate is below a predetermined threshold. If the transmission rate is below the threshold (and/or at a time when an integral amount of data that was sent for a given time period becomes smaller by above a predetermined value, than an initially-estimated amount of data, during a process of sending the encoded data), then Step S614 follows to select an optimum one of the plurality of parameter sets again.

In contrast, if the transmission rate is not below the threshold, then Step S616 follows to send the remaining portion of the video data set.

This step is implemented by the encoding-parameter changer 126 illustrated in FIG. 3.

As will be evident from the foregoing, the present embodiment allows the to-be-sent video data to be encoded using a selected parameter set which maximizes the resulting quality of the encoded data, while ensuring that the video data reaches the destination by the deadline time. In some cases, on-time arrival of the video data is achieved by sacrificing the quality of the encoded data, meaning that the on-time arrival is prioritized relative to the encoding quality.

Additionally, the present embodiment, if the transmission rate changes significantly, updates the parameter set used to accommodate the change in the transmission rate (especially, a transmission-rate drop), even in the course of the encoding and transmission.

In either event, the present embodiment requires the user to only identify the video data set that is to be sent, and the deadline time, in the data transmission device 1.

In particular, for a video transmission system for broadcasting which is used in various locations including overseas locations, it is difficult to use stabilized network communications. Due to this, there is a strong need for successful transmission of video data to arrive at the destination by the deadline time, while taking care of network transmission quality.

In addition, because video data for broadcasting is required to have maximized quality, there is another strong need for selecting an encoding parameter for the video data, in consideration of the length of a remaining time from a current time to the deadline time.

The present embodiment reduces an unintended extension of a time spent to send the video data, when a network quality drops, into within the time limit, while maximizing the quality of the video data sent. In addition, even in urgent situations like immediate broadcasting, only the user's simplified action allows immediate transmission of the video data.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for data processing including encoding and sending, comprising:

an encoder encoding data using a selected one of a plurality of encoding parameter sets:
a transmitter transmitting the encoded data to a receiver via a communication network;
a condition-identifying device identifying an original data set for which the data processing is to be initiated at a start time $t_0$, and identifying a deadline time $t_L$ by which the data processing is to be completed, wherein the original data set is one data sub-set or a sequence of two or more data sub-sets;
an assigned-time calculator calculating a length of an assigned time not exceeding a time limit ($=t_L-t_0$) for the original data set, per each data sub-set;
a processing-time calculator calculating an estimate of an individual processing time $T_P$ to encode and send each data sub-set using a successively-selected one of the plurality of encoding parameter sets, per each data sub-set, based on the assigned time for the each data sub-set, an estimate of an encoding time $T_E$ to encode the each data sub-set using the successively-selected one encoding parameter set, and an estimate of a sending time $T_T$ to send the encoded data sub-set at a transmission rate; and
an encoding-parameter selector selecting one of the plurality of encoding parameter sets to allow a total processing time to fall within a shortened time limit ($=\alpha \cdot t_L-t_0$, $0<\alpha<1$) that is equal to the time limit ($=t_L-t_0$) minus a marginal time,
wherein the total processing time, if the original data set is one data sub-set, is equal to the individual processing time for the one data sub-set, or if the original data set includes a sequence of two or more data sub-sets, is equal to a total of the individual processing times for the two or more data sub-sets.

2. The apparatus according to claim 1, wherein the original data set includes a video data set,
the at least one encoding parameter includes one or more of the followings:
a ratio of frames to be encoded using intra-frame prediction in a spatial field;
a ratio of frames to be encoded using inter-frame prediction;
a size of search for inter-frame prediction;
a type of an algorithm for inter-frame prediction;
a size of quantization parameters;
a factor for pixel subsampling;
a factor for chroma subsampling;
a number of frames per a unit time;
a type of an encoding algorithm for data compression;
a type of frequency transformation of pixels;
a video format;
an image size (image resolution);
a frame rate; and
a bit rate for encoding.

3. The apparatus according to claim 2, wherein the assigned-time calculator calculates, if the original data set are a sequence of two or more data sub-sets, the length of the assigned time for each of data sub-set, based on one or more of the followings: a play-back-time ratio, an image-size ratio, a frame-rate ratio, and a bit-rate ratio, between the data sub-sets within the original data set.

4. The apparatus according to claim 1, further comprising a transmission-rate detector measuring the transmission rate at which data flows over the network, during a process of sending the encoding data.

5. The apparatus according to claim 4, wherein the transmission-rate detector samples transmission rates in a plurality of different time zones within a day or a few days, and calculates a representative transmission rate based on the sampled transmission rates.

6. The apparatus according to claim 1, wherein the encoding-parameter selector selects one of the plurality of encoding parameter sets, which allows the total processing time to end at a time closer to an advanced deadline time ($=\alpha \cdot t_L$), than any other parameter sets.

7. The apparatus according to claim 1, further comprising:
a performance detector causing the encoder to encode test data, using a successively-selected one of the plurality of encoding parameter sets, measuring an encoding time to encode the test data, and obtaining an encoding time to encode a portion of the original data set which has a unit size; and
an encoding-time storage storing encoding times obtained by the performance detector, in association with the respective encoding parameter sets,
wherein the processing-time calculator calculate the processing time by reference to the encoding times stored in the encoding-time storage.

8. The apparatus according to claim 4, further comprising an encoding-parameter changer activating the processing-time calculator and the encoding-parameter selector again, at a time when the transmission-rate detector measures the transmission rate lower than a predetermined threshold, during a process of sending the encoded data, and/or at a time when an integral amount of data that was sent for a given time period becomes smaller by above a predetermined value, than an initially-estimated amount of data, during a process of sending the encoded data.

9. The apparatus according to claim 8, wherein the transmission-rate detector measures the transmission rate periodically, and/or
the transmission-rate detector measures the transmission rate, at one or more of the followings:
a time when encoding the original data set is completed,
a time during which encoded data is being sent,
a time when sending the encoded data is completed,
a time when a percentage of the encoding operation that has been finished reaches a given value,
a time when a percentage of the sending operation that has been finished reaches a given value, and
a time when a percentage of the entire data processing operation that has been finished reaches a given value, and
the encoding-parameter changer estimates the transmission rate at a subsequent time, based on at least one transmission rate measured at least one previous time.

10. A method for data processing including encoding and sending, comprising:
encoding data using a selected one of a plurality of encoding parameter sets:
sending the encoded data to a receiver via a communication network;
identifying an original data set for which the data processing is to be initiated at a start time $t_0$, and identifying a deadline time $t_L$ by which the data processing is to be completed, wherein the original data set is one data sub-set or a sequence of two or more data sub-sets;
calculating a length of an assigned time not exceeding a time limit ($=t_L-t_0$) for the original data set, per each data sub-set;
calculating an estimate of an individual processing time $T_P$ to encode and send each data sub-set using a successively-selected one of the plurality of encoding parameter sets, per each data sub-set, based on the assigned time for the each data sub-set, an estimate of an encoding time $T_E$ to encode the each data sub-set using the successively-selected one encoding parameter set, and an estimate of a sending time $T_T$ to send the encoded data sub-set at a transmission rate; and selecting one of the plurality of encoding parameter sets to allow a total processing time to fall within a shortened time limit ($=\alpha \cdot t_L - t0$, $0<\alpha<1$) that is equal to the time limit ($=t_1 - t_0$) minus a marginal time, wherein the total processing time, if the original data set is one data sub-set, is equal to the individual processing time for the one data sub-set, or if the original data set includes a sequence of two or more data sub-sets, is equal to a total of the individual processing times for the two or more data sub-sets.

11. A computer-readable non-transitory recording media having stored therein a program, when executed by a computer, to implement the method according to claim 10.

12. A method for data processing including encoding and sending, comprising:

encoding original data using a selected one of a plurality of encoding parameter sets;

sending the encoded data to a receiver via a communication network;

calculating a time limit ($=t_L - t_0$) for the data processing of the original data, from a start time t0 at which the data processing is to be initiated, and a deadline time $t_L$ by which the data processing is to be completed;

calculating an estimate of a processing time to encode and send the original data using a successively-selected one of the plurality of encoding parameter sets, based on an estimate of an encoding time to encode the original data using the successively-selected one encoding parameter set, and an estimate of a sending time to send the encoded data at a transmission; and selecting one of the plurality of encoding parameter sets to allow the estimate of the processing time to fall within a shortened time limit ($=\alpha \cdot t_L - t_0$, $0<\alpha<1$) that is equal to the time limit ($=t_L - t_0$) minus a marginal time.

* * * * *